J. D. BRUNER.
Safe-Spindle.
No. 218,704. Patented Aug. 19, 1879.
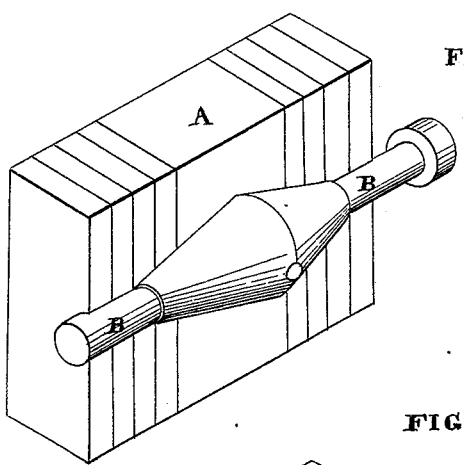
FIG. 1
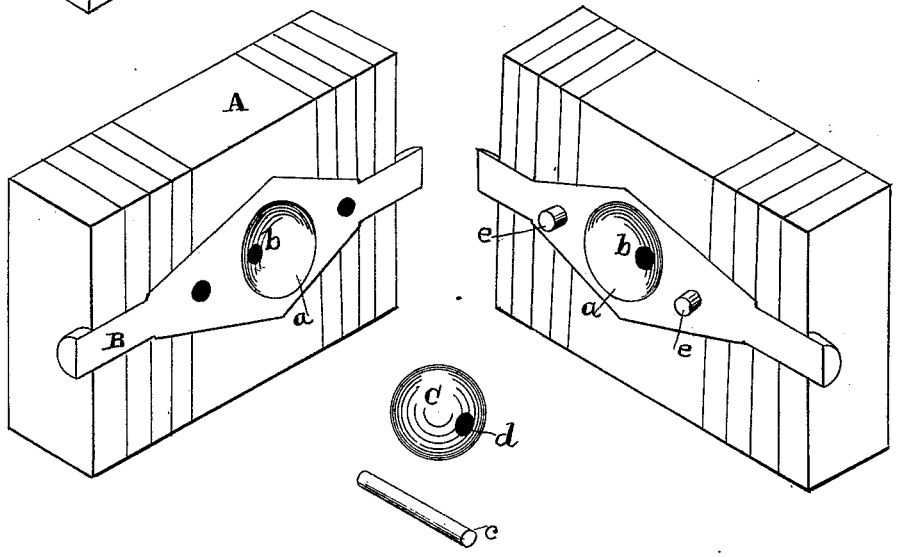
FIG. 2.
FIG. 3.
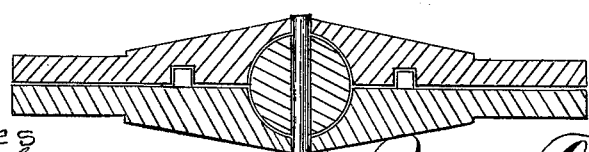
Witnesses
Geo. H. Strong.
Frank A. Brooks
Inventor
James D. Bruner
By Dewey & Co.
Atty

UNITED STATES PATENT OFFICE.

JAMES D. BRUNER, OF SAN FRANCISCO, CALIFORNIA.

IMPROVEMENT IN SAFE-SPINDLES.

Specification forming part of Letters Patent No. 218,704, dated August 19, 1879; application filed April 29, 1879.

*To all whom it may concern:*

Be it known that I, JAMES D. BRUNER, of the city and county of San Francisco, and State of California, have invented a Burglar-Proof Spindle or Arbor for Safes or Vaults; and I hereby declare the following to be a full, clear, and exact description thereof, reference being made to the accompanying drawings.

My invention relates to an improved burglar-proof spindle or arbor for safes or vaults; and it consists in constructing the spindle, and inserting in a countersunk receptacle in it a hardened-steel roller or ball which will resist a drill, so that any attempt to force the safe will be futile.

Figure 1 is a view of my spindle or arbor. Fig. 2 shows the spindle separated. Fig. 3 is a section.

The door A is made of alternate plates of iron and steel, in the ordinary manner. The spindle or arbor B is used for connecting the handle or dial-plate in setting the combination, and throwing back the bolts used in locking or unlocking the safe. This spindle or arbor is made of a double-cone shape, as shown, and is formed in two pieces by being split lengthwise. On the two flat sides at the center a half-circle is countersunk, as shown at $a$, making, when the two parts are put together, a globular countersunk hole, one-third or more larger in diameter than either end of the spindle. In each piece, at the bottom of the countersunk hemisphere, is a hole, $b$, about one-quarter of an inch in diameter, with a countersink on the outside surface.

A steel ball, C, is made to fit into the countersunk central receptacle when the parts are closed together, so as to fill the space. Through the center of the ball is a quarter-inch hole, $d$, for a pin, $c$, to project far enough through so that when the two parts of the arbor or spindle are put together the pin will be long enough to pass through the holes $b$ and rivet up flush on the outside into the countersinks, thus holding the two halves firmly together. This hole also allows the ball in process of manufacture to be hardened from the interior as well as the exterior surface.

The dowel-pins $e$ are tempered drill-proof before being placed in the spindle or arbor.

The ball is of solid steel, the hole only being made through it for the connecting-pin, which is of soft steel.

No parts of the spindle or arbor are made drill-proof except the ball and dowel-pins. The spindle or arbor, being left soft, will be less liable to crack or break by a blow or strain.

In some cases it may be found sufficient to employ a roller in place of the ball, as this will also turn a drill when it reaches it; but the ball is better on account of its universal motion.

The spindle or arbor is placed in the door of a safe or vault, so that its enlarged portion will come between the drill-proof steel plates, thus preventing the ball being driven down through the door, or extracting it from the vault or safe.

It is well known that burglars in effecting an entrance into a safe frequently drill through and break off the spindle, after which they can throw or force the bolts back and open the door.

My invention has for its object the prevention of this method of opening safes. There is no room at the ends of the spindle for a mandrel to be inserted. If the arbor is cut down by a chisel or drill, the moment the steel ball is reached, being hardened and drill-proof on the surface, and placed in the position it is, further cutting is prevented. It will also revolve in its seat, and the chisel or drill be turned off into the arbor. The ball is a separate body from the spindle or arbor, but is contained in it, and its pins help hold the two parts together. The spindle is thus strengthened so as to resist a drill, or any attempt to force the safe.

I am aware that tapering spindles divided transversely have been employed heretofore in safes, and that plates of a hard material have been employed within a spindle, said plates being made of larger diameter than the ends of the spindle.

I am also aware that balls have been used in the walls of safes; but I am not aware that a single ball or roller has been employed within a spindle which will, by its hardness and motion, turn a drill out of its course, while said ball is so large that it cannot be extracted through any hole which can be made in the spindle from the outside of the safe.

Having thus described my invention, what I claim as new, and desire to secure by Letters Patent, is—

A drill-proof arbor or spindle for doors of vaults or safes, formed in two parts, and of a double-cone shape, with a globular counter- sunk portion at its center containing a freely-moving hardened-steel ball, the parts of said arbor being secured together by the pin through said ball, substantially as and for the purpose herein described.

In witness whereof I have hereunto set my hand.

JAMES D. BRUNER.

Witnesses:
  GEO. H. STRONG,
  S. H. NOURSE.